United States Patent
Ha et al.

(10) Patent No.: US 10,349,078 B2
(45) Date of Patent: Jul. 9, 2019

(54) METHOD AND DEVICE FOR PROCESSING VIDEO SIGNAL BY PERFORMING INTER-PREDICTION IN PARALLEL

(71) Applicant: LG ELECTRONICS INC., Seoul (KR)

(72) Inventors: Jaewon Ha, Seoul (KR); Naeri Park, Seoul (KR); Sungho Bae, Seoul (KR); Jinseok Im, Seoul (KR); Cheoljoo Lee, Seoul (KR); Hyunsoo Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 195 days.

(21) Appl. No.: 15/037,594

(22) PCT Filed: Nov. 20, 2014

(86) PCT No.: PCT/KR2014/011190
§ 371 (c)(1),
(2) Date: May 18, 2016

(87) PCT Pub. No.: WO2015/076580
PCT Pub. Date: May 28, 2015

(65) Prior Publication Data
US 2016/0309178 A1    Oct. 20, 2016

Related U.S. Application Data (60) Provisional application No. 61/906,428, filed on Nov. 20, 2013.

(30) Foreign Application Priority Data

Mar. 20, 2014 (KR) .......................... 10-2014-0032492

(51) Int. Cl.
  H04N 19/436    (2014.01)
  H04N 19/52     (2014.01)
  H04N 19/82     (2014.01)

(52) U.S. Cl.
  CPC ........... *H04N 19/52* (2014.11); *H04N 19/436* (2014.11); *H04N 19/82* (2014.11)

(58) Field of Classification Search
  CPC ....... H04N 19/436; H04N 19/52; H04N 19/82
  (Continued)

(56) References Cited

U.S. PATENT DOCUMENTS

2008/0049844 A1* 2/2008 Liu .................. H04N 19/61
    375/240.27
2010/0239024 A1* 9/2010 Chikamura ........... H04N 19/52
    375/240.23

(Continued)

FOREIGN PATENT DOCUMENTS

KR  10-2011-0055022 A    5/2011
KR  10-2011-0129089 A    12/2011

(Continued)

OTHER PUBLICATIONS

Zhao et al., "A Dynamic Slice Control Scheme for Slice-Parallel Video Encoding" Microscoft Research, IEEE, 2012.*

*Primary Examiner* — Jamie J Atala
*Assistant Examiner* — James T Boylan
(74) *Attorney, Agent, or Firm* — Dentons US LLP (57) ABSTRACT

In a method for processing a video signal, according to the present invention, a first video decoder can extract motion information for inter prediction on a current half frame from a bitstream, a second video decoder can perform the inter prediction on the current half frame by using the extracted motion information, and the first video decoder can restore (Continued)

the inter-predicted current half frame. Accordingly, the coding time of a video sequence can be reduced.

2 Claims, 6 Drawing Sheets

(58) Field of Classification Search
USPC .................................. 375/240.16, 240.25
See application file for complete search history.

(56) References Cited

U.S. PATENT DOCUMENTS

| | | | |
|---|---|---|---|
| 2011/0085601 A1* | 4/2011 | Lee ................... | H04N 19/44 375/240.25 |
| 2011/0116548 A1* | 5/2011 | Amano ............... | H04N 19/52 375/240.16 |
| 2011/0116550 A1* | 5/2011 | Lee ................... | H04N 19/61 375/240.25 |

FOREIGN PATENT DOCUMENTS

| | | |
|---|---|---|
| KR | 10-2013-0070191 A | 6/2013 |
| KR | 10-1292668 B1 | 8/2013 |

* cited by examiner

METHOD AND DEVICE FOR PROCESSING VIDEO SIGNAL BY PERFORMING INTER-PREDICTION IN PARALLEL

This application is a National Stage Application of International Application No. PCT/KR2014/011190, filed on Nov. 20, 2014, which claims the benefit of U.S. Provisional Application No. 61/906,428, filed on Nov. 20, 2013 and Korean Patent Application No. 10-2014-0032492, filed on Mar. 20, 2014, all of which are hereby incorporated by reference in their entirety for all purposes as if fully set forth herein.

TECHNICAL FIELD

The present invention relates to a method of processing a video signal and apparatus for the same.

BACKGROUND ART

Compression coding means a series of signal processing technology for transmitting digitalized information through a communication line or saving the digitalized information in form suitable for a storage medium. Targets of the compression coding include such targets as audio, image, text and the like. Particularly, a technology of performing compression coding by targeting a video is called a video image compression. The compression coding on a video signal is performed by removing redundant information in consideration of spatial correlation, temporal correlation, probabilistic correlation and the like. However, to keep up with the recent developments of various media and data transmission media, the demand for a video signal processing method and apparatus of high efficiency is increasingly rising.

DISCLOSURE OF THE INVENTION

Technical Task

The object of the present invention is to raise coding efficiency of a video signal.

Technical Solutions

The technical task of the present invention is to provide a method of processing a video signal and apparatus for the same, by which a single frame is parallel-processed by half frame unit using a plurality of video decoders.

In case that there is a reference relation between parallel-processed half frames, the technical task of the present invention is to provide a method of processing a video signal and apparatus for the same, by which the corresponding half frame is inter-predicted.

The technical task of the present invention is to provide a method of processing a video signal and apparatus for the same, by which in-loop filtering can be performed on a plurality of coding unit sequences configuring a single half frame.

Advantageous Effects

Effects of a method of processing a video signal and apparatus for the same according to the present invention are described as follows.

According to at least one of embodiments of the present invention, one video decoder sequentially performs inter prediction on a video sequence by half frame unit in order of coding and another video decoder performs restoration and in-loop filtering on an inter-predicted half frame, whereby a plurality of video decoders can perform full-time operations. Moreover, it is advantageous in reducing a decoding time of a video sequence.

And, according to at least one of embodiments of the present invention, if there is a reference relation between parallel-processed half frames, after the parallel processing has been completed, inter prediction is additionally performed. Hence, it is advantageous in reducing errors due to inter prediction and maintaining compatibility with an existing codec.

Moreover, according to at least one of embodiments of the present invention, using a reconstructed border row in the course of in-loop filtering on a reconstructed half frame, a decoded half frame in the same size of the reconstructed half frame can be advantageously obtained.

BEST MODE FOR INVENTION

In one technical aspect of the present invention, provided herein is a method of processing a video signal, including the steps of extracting a motion information for an inter prediction of a current half frame from a bitstream in a first video decoder, performing the inter prediction on the current half frame using the extracted motion information in a second video decoder, and reconstructing the inter-predicted current half frame in the first video decoder.

Moreover, the inter prediction performing step according to the present invention includes the steps of checking whether the current half frame is a top half frame and if the current half frame is the top half frame, performing an inter prediction of a current block based on whether a reference block of the current block included in the current half frame belongs to a bottom half frame of a previous frame.

Moreover, the step of performing the inter prediction of the current block according to the present invention includes the steps of if the reference block does not belong to the bottom half frame of the previous frame, performing the inter prediction of the current block using a sample value of the reference block and if the reference block belongs to the bottom half frame of the previous frame, skipping the inter prediction of the current block.

Moreover, the method further includes the step of if the inter prediction of the current block is skipped, performing the inter prediction of the current block using a motion information of the current block after completion of a decoding on the bottom half frame of the previous frame.

Moreover, the method further includes the step of if the current half frame corresponds to a top half frame, parallely performing an inter prediction on a border row of the current half frame in the first video decoder in the course of performing the inter prediction on the current half frame.

Moreover, the method further includes the step of performing an in-loop filtering on the reconstructed current half frame in the first video decoder.

Moreover, the in-loop filtering performing step according to the present invention includes the steps of reconstructing the inter-predicted border row in the first video decoder and performing the in-loop filtering on at least one sample of the reconstructed current half frame using at least one sample of the reconstructed border row in the first video decoder.

In another technical aspect of the present invention, provided herein is an apparatus for processing a video signal, including a first video decoder extracting a motion information for an inter prediction of a current half frame from a bitstream, a second video decoder performing the inter prediction on the current half frame using the extracted motion information, and the first video decoder reconstructing the inter-predicted current half frame.

Moreover, if the current half frame is a top half frame, the second video decoder according to the present invention performs an inter prediction of a current block based on whether a reference block of the current block included in the current half frame belongs to a bottom half frame of a previous frame.

Moreover, if the reference block does not belong to the bottom half frame of the previous frame, the second video decoder according to the present invention performs the inter prediction of the current block using a sample value of the reference block and wherein if the reference block belongs to the bottom half frame of the previous frame, the second video decoder skips the inter prediction of the current block.

Moreover, if the inter prediction of the current block is skipped, the first video decoder performs the inter prediction of the current block using a motion information of the current block after completion of a decoding on the bottom half frame of the previous frame.

Moreover, if the current half frame corresponds to a top half frame, the first video decoder parallely performs an inter prediction on a border row of the current half frame in the first video decoder in the course of performing the inter prediction on the current half frame.

Moreover, the first video decoder performs an in-loop filtering on the reconstructed current half frame in the first video decoder. And, the first video decoder reconstructs the inter-predicted border row in the first video decoder and performs the in-loop filtering on at least one sample of the reconstructed current half frame using at least one sample of the reconstructed border row in the first video decoder.

Mode for Invention

Reference will now be made in detail to the preferred embodiments of the present invention, examples of which are illustrated in the accompanying drawings. First of all, terminologies or words used in this specification and claims are not construed as limited to the general or dictionary meanings and should be construed as the meanings and concepts matching the technical idea of the present invention based on the principle that an inventor is able to appropriately define the concepts of the terminologies to describe the inventor's intention in best way. The embodiment disclosed in this disclosure and configurations shown in the accompanying drawings are just one preferred embodiment and do not represent all technical idea of the present invention. Therefore, it is understood that the present invention covers the modifications and variations of this invention provided they come within the scope of the appended claims and their equivalents at the timing point of filing this application.

Figure 1:
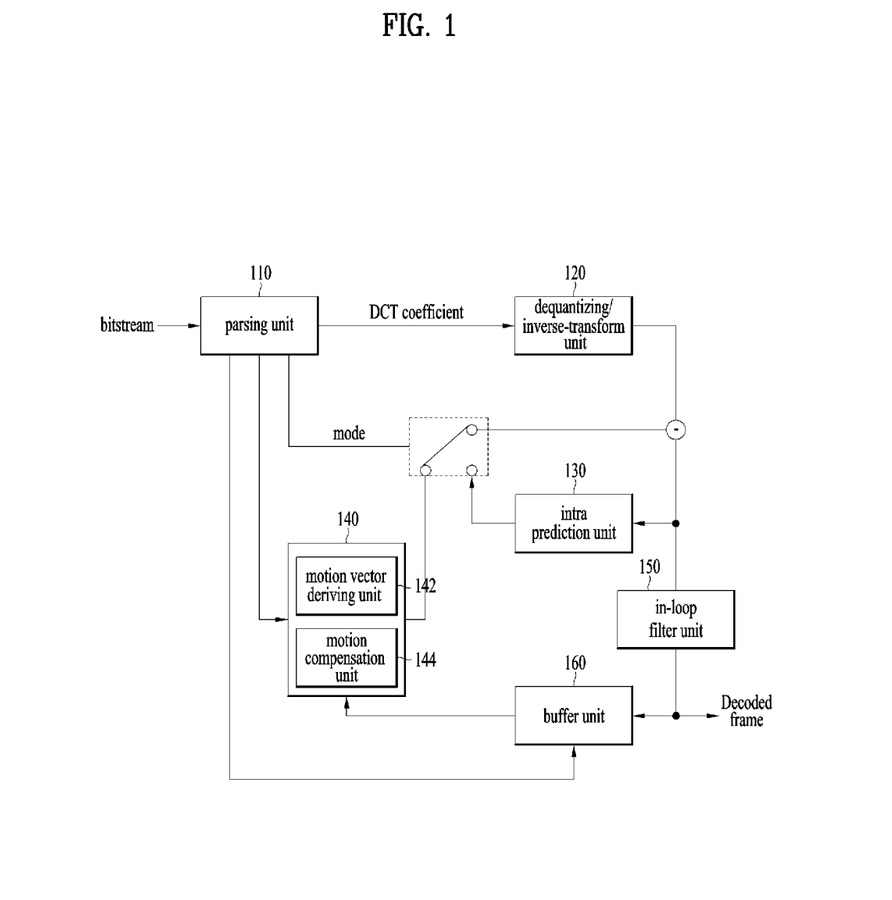
FIG. 1 is a schematic block diagram of a video signal decoding device according to the present invention.

FIG. 1 is a schematic block diagram of a video decoder 100 according to the present invention.

A video decoder 100 may include a parsing unit 110, a dequantization/inverse-transform unit 120, an intra prediction unit 130, an inter prediction unit 140, an in-lop filter unit 150, a buffer unit 160 and the like.

The parsing unit 110 can receive a bitstream coded with data of a video image. In order to decode the received bitstream, the parsing unit 110 is able to extract coding information (e.g., block partition information, intra prediction mode, motion information, reference index, etc.) for predicting the video image, quantized transform coefficients corresponding to residual data of the video image and the like by performing parsing by NAL units.

The dequantization/inverse-transform unit 120 obtains a scaled transform coefficient by scaling the quantized transform coefficient using a quantization parameter and is then able to reconstruct the residual data by inverse transforming the scaled transform coefficient.

The intra prediction unit 130 can perform intra prediction using a neighbor sample adjacent to a current block and an intra prediction mode. In this case, the neighbor sample includes a sample located at a left side, a left bottom side, a top side, or a right top side of the current block and may mean a sample completely reconstructed prior to the current block. Moreover, the intra prediction mode may be extracted from the bitstream or derived based on at least one intra prediction mode of a left neighbor block or a top neighbor block of the current block.

The inter prediction unit 140 may include a motion vector deriving unit 142 and a motion compensation unit 144. Alternatively, the motion vector deriving unit 142 may not be included in the inter prediction unit 140. For instance, the motion vector deriving unit 142 may be included in the parsing unit 110 according to an implementation scheme. In this case, the motion vector deriving unit 142 can derive a motion vector using the motion information extracted from the bitstream. The motion information may include a motion vector prediction information and a differential motion vector. In this case, the motion vector prediction information means an index information that specifies a motion vector prediction value of the current block, and the differential motion vector means a difference between the motion vector and the motion vector prediction value. A detailed motion vector deriving method shall be described with reference to FIG. 2 later. Meanwhile, the motion compensation unit 144 specifies a reference block based on the derived motion vector and a reference index and is then able to perform inter prediction on the current block suing a sample value of the reference block.

The in-loop filter unit 150 can apply an in-loop filter to a reconstructed block to reduce a block distortion effect. The in-loop filter can improve an image quality of a decoded frame by smoothening a border between blocks or a border between samples in a block. An in-loop filter applied frame may be outputted or saved to the buffer unit 160 to be used as a reference frame.

The buffer unit 160 can play a role in storing or opening previously decoded frames to perform inter prediction.

Figure 2:
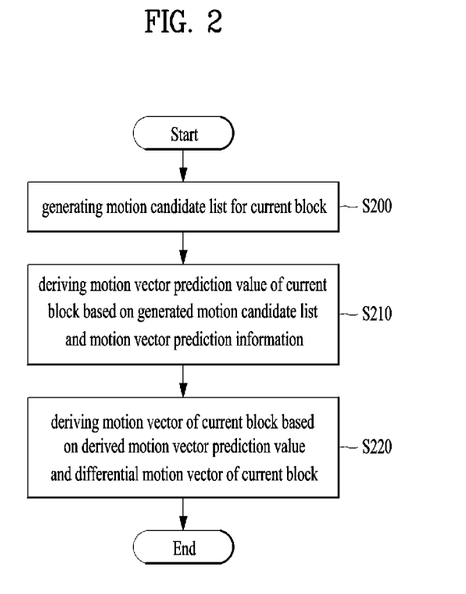
FIG. 2 is a flowchart of a method for a motion vector deriving unit 142 to derive a motion vector using motion information of a current block according to one embodiment of the present invention.

FIG. 2 is a flowchart of a method for the motion vector deriving unit 142 to derive a motion vector using motion information of a current block according to one embodiment of the present invention.

Referring to FIG. 2, it is able to generate a motion candidate list for a current block [S200]. The motion candidate list can include a plurality of motion vector candidates usable as a motion vector prediction value of the current block. In particular, the motion vector candidate can include at least one of a motion vector of a spatial neighbor block and a motion vector of a temporal neighbor block. The spatial neighbor block means a neighbor block spatially adjacent to the current block. For instance, the spatial neighbor block may mean at least one of a left neighbor block and a top neighbor block of the current block. The temporal neighbor block may mean a block having a center location of the current block or a block having a right bottom location of the current block in a frame located in a time slot different from that of a current frame including the current block.

Based on the generated motion candidate list and motion vector prediction information, it is able to derive a motion vector prediction value of the current block [S210]. In particular, the motion vector prediction value of the current block can be set to a motion vector candidate specified by the motion vector prediction information among a plurality of the motion vector candidates of the current block.

Based on the derived motion vector prediction value and a differential motion vector of the current block, it is able to derive a motion vector of the current block [S220].

Figure 3:
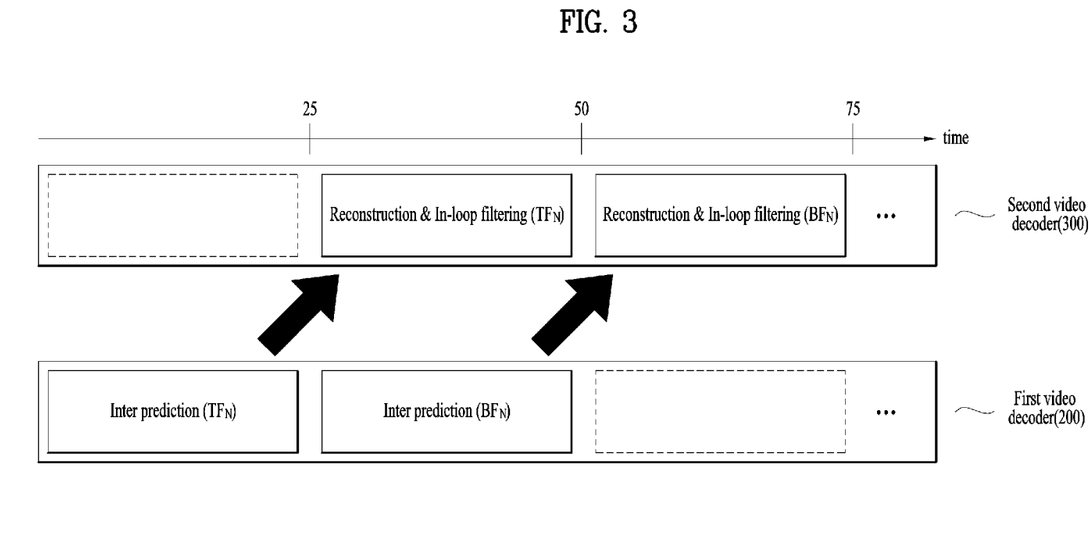
FIG. 3 shows a process for performing a parallel processing on a single frame using a plurality of video decoders according to one embodiment of the present invention.

FIG. 3 shows a process for performing a parallel processing on a single frame using a plurality of video decoders according to one embodiment of the present invention.

Referring to FIG. 3, a first video decoder 200 and a second video decoder 300 correspond to a configuration for performing a parallel processing on a single frame by half frame unit. Each of the first video decoder 200 and the second video decoder 300 may include all components of the former video decoder 100 described with reference to FIG. 1 or may selectively include some components of the video decoder 100 according to an implementation scheme.

Moreover, for the convenient understanding of the present invention, in case that a time taken to decode a single frame is 100, assume that a time taken to perform an inter prediction of the corresponding frame is 50.

Looking into a parallel processing process using the first and second video decoders 200 and 300, first of all, the second video decoder 300 can perform an inter prediction using a motion information of a top half frame $TF_N$ of a frame N. In this case, the motion information may be extracted from a bitstream through an entropy decoding by the first video decoder 200.

The second video decoder 300 sends the inter-predicted top half frame $TF_N$ to the first video decoder 200 and is able to perform an inter prediction using a motion information of a bottom half frame $BF_N$ of the frame N.

Meanwhile, while the second video decoder 300 performs the inter prediction on the bottom half frame $BF_N$, the first video decoder 200 reconstructs the top half frame $TF_N$ sent from the second video decoder 300 and is then able to apply an in-loop filter to the reconstructed top half frame $TF_N$.

In particular, regarding a process for reconstructing the top half frame $TF_N$, by performing an intra prediction on a block failing to be prediction-processed in the top half frame $TF_N$ sent from the second video decoder 300, and more particularly, on an intra mode coded block and dequantizing & inverse-transforming a quantized transform coefficient extracted from a bitstream, it is able to obtain residual data. Subsequently, it is able to reconstruct a sample value of the top half frame $TF_N$ using the sample prediction value obtained through the inter prediction and/or the intra prediction and the residual data.

Likewise, the second video decoder 300 performs an inter prediction on the bottom half frame $BF_N$ and is then able to send it to the first video decoder 200. After the decoding of the top half frame $TF_N$ has been completed, the first video decoder 200 reconstructs the sent bottom half frame $BF_N$ and is then able to apply an in-loop filter to the reconstructed bottom half frame $BF_N$. Thus, by performing a parallel processing on a single frame by half frame unit using the first video decoder 200 and the second video decoder 300, it is able to reduce a time taken to decode a single frame into a half of an existing time taken to do the same.

Figure 4:
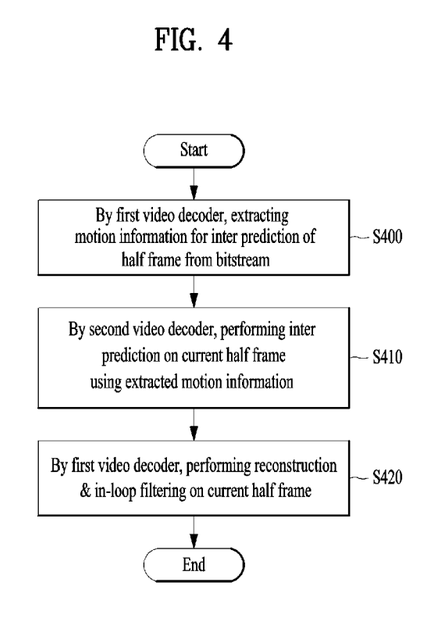
FIG. 4 is a flowchart for a method for a video signal processing device 200 to decode a current half frame according to one embodiment of the present invention.

FIG. 4 is a flowchart for a method for a video signal processing device 200 to decode a current half frame according to one embodiment of the present invention.

The first video decoder 200 can extract a motion information for an inter prediction of a current half frame from a bitstream [S400]. The current half frame may mean one of a top half frame and a bottom half frame of a current frame.

The second video decoder 300 can perform an inter prediction on the current half frame using the extracted motion information [S410]. In this case, the inter prediction can be performed by considering whether the current half frame is the top half frame or the bottom half frame, which will be described in detail with reference to FIG. 5 later. Meanwhile, if the current half frame inter-predicted by the second video decoder 300 corresponds to the top half frame, the first video decoder 200 is able to perform an inter prediction on a border row of the current half frame parallely for an in-loop filtering of the current half frame while the second video decoder 300 performs the inter prediction on the current half frame. This shall be described with reference to FIG. 6 later.

The first video decoder 200 reconstructs the current half frame inter-predicted in the step S410 and is then able to perform an in-loop filtering on the reconstructed current half frame [S420]. Since a process for reconstructing a half frame has been described in detail with reference to FIG. 3, its details shall be omitted.

Figure 5:
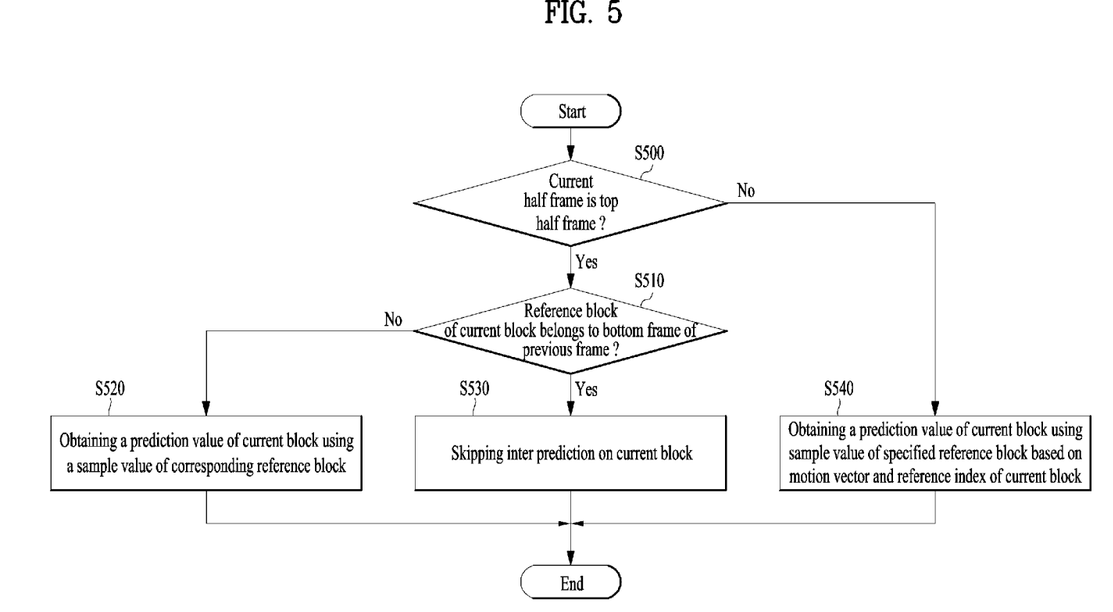
FIG. 5 is a flowchart for an inter prediction process in a second video decoder 300 according to one embodiment of the present invention.

FIG. 5 is a flowchart for an inter prediction process in the second video decoder 300 according to one embodiment of the present invention.

Referring to FIG. 5, it is able to check whether a current half frame is a top half frame [S500].

In particular, whether the current half frame is the top half frame can be configured based on a location of an inter-mode coded current block as a block belonging to the current half frame. If the location of the current block belongs to the top half frame of a current frame, the current half frame may be regarded as corresponding to the top half frame. Otherwise, the current half frame may be regarded as corresponding to a bottom half frame.

As a result of the check in the step S500, if the current half frame is the top half frame, it is able to check whether a reference block belongs to a bottom half frame of a previous frame based on a motion vector and a reference index of the current block [S510].

In this case, the previous frame may mean a frame having a coding order right before the current frame. And, the bottom half frame of the previous frame may mean a frame decoded parally by the first video decoder 200 while the current half frame is inter-predicted by the second video decoder 300.

As a result of the check in the step S510, if the reference block of the current block does not belong to the bottom half frame of the previous frame, it is able to obtain a prediction value of the current block using a sample value of the corresponding reference block [S520].

Yet, if the reference block of the current block belongs to the bottom half frame of the previous frame, it is able to skip an inter prediction on the current block [S530]. The reason for this is that a sample to be referred to by the current block does not exist due to the reference block currently decoded by the video decoder 200 in parallel with the current block. Thus, the second video decoder 300 may send the corresponding motion information on an inter prediction skipped block to the first video decoder 200, and the first video decoder 200 can perform the inter prediction using the motion information received after completing the decoding of the bottom half frame of the previous frame.

Meanwhile, as a result of the check in the step S500, if the current half frame is the bottom half frame, a reference block is specified based on the motion vector and reference index of the current block and a prediction value of the current block can be then obtained using a sample value of the specified reference block [S540].

Figure 6:
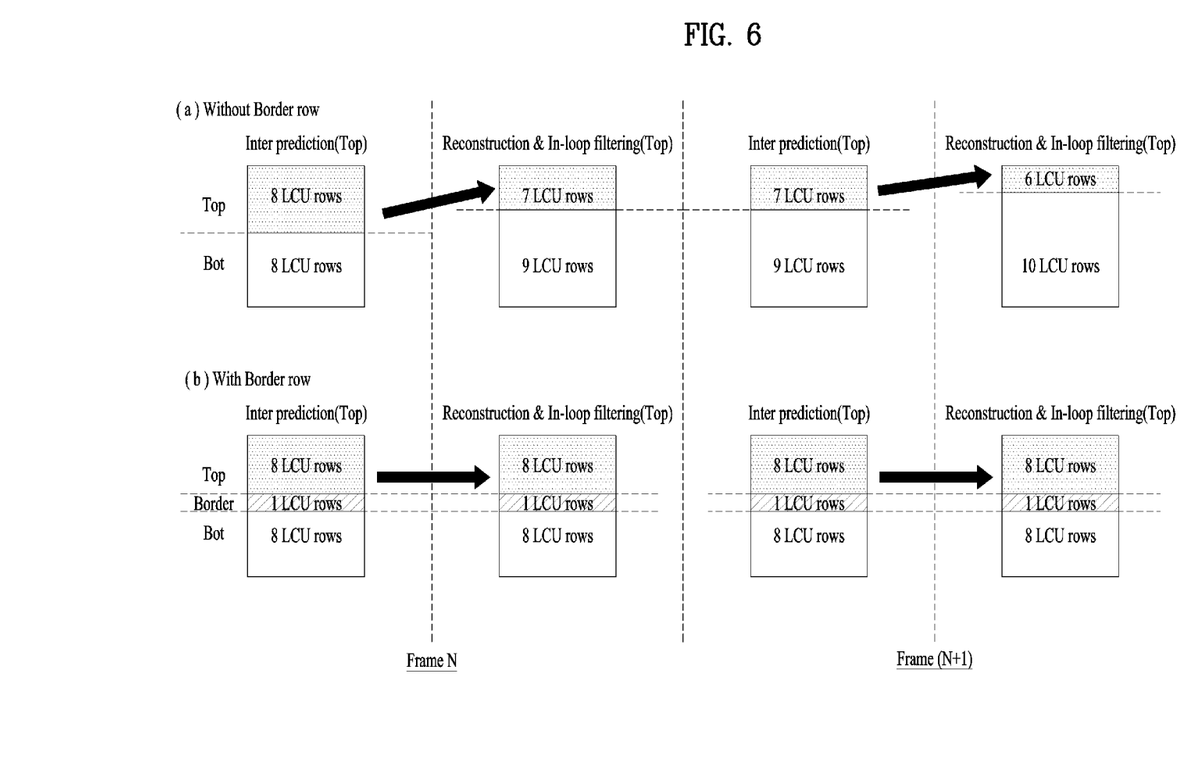
FIG. 6 shows a decoding process of a current half frame according to a presence or non-presence of inter prediction on a border row of the current half frame in a first video decoder 200 according to one embodiment of the present invention.

FIG. 6 shows a decoding process of a current half frame according to a presence or non-presence of inter prediction on a border row of the current half frame in the first video decoder 200 according to one embodiment of the present invention.

In FIG. 6, assume that a single frame is constructed with 17 coding unit rows. Assume that 8 coding unit rows arranged on a top correspond to a top half frame. And, assume that 9 coding unit rows arranged on a bottom correspond to a bottom half frame. A coding unit means a basic unit for processing a video signal, and a size of the coding unit can be adaptively determined by an encoder stage in consideration of coding efficiency.

FIG. 6(a) shows a process for decoding a top half frame without an inter prediction performed on a border row of the top half frame. Referring to FIG. 6(a), the second video decoder 300 performs an inter prediction on a top half frame of a frame N. The first video decoder 200 reconstructs the inter-predicted top half frame and is then able to perform an in-loop filtering on the reconstructed top half frame. In this case, the in-loop filtering uses the reconstructed samples on both sides centering on a block border. In particular, if the block border is a horizontal border, the in-loop filtering is performed using the reconstructed samples located at top and bottom centering on the corresponding horizontal border. Yet, while the first video decoder 200 performs the reconstruction and in-loop filtering on the top half frame of the frame N, since the second video decoder 300 performs the inter prediction parally on a bottom half frame of the frame N, it is unable to perform the in-loop filtering on a coding unit row located on a most lower end in the top half frame of the frame N. Hence, although the second video decoder 300 performs the inter prediction on 8 coding unit rows, the first video decoder 200 may finally decode 7 coding unit rows only after performing the in-loop filtering.

Moreover, in case of performing an inter prediction on a top half frame of a frame (N+1) by referring to the decoded top half frame of the frame N, since the 7 coding unit rows of the top half frame of the frame N have been decoded only, the second video decoder 300 can also inter-predict 7 coding unit rows of the top half frame of the frame (N+1) only. Likewise, the first video decoder 200 may decode 6 coding unit rows only after performing the in-loop filtering. Thus, each of the first video decoder 200 and the second decoder 300 fails to decode the 8 coding unit rows of the top half frame but decodes only the coding unit rows cumulatively reduced by 1 coding unit row per frame. The reason for this is that the second video decoder 300 performs the inter prediction on the bottom half frame of the current frame parally while the first video decoder 200 performs the reconstruction and the in-loop filtering on the top half frame of the current frame. Hence, in order to decode all the 8 coding unit rows of the top half frame, as shown in FIG. 6(b), the first video decoder 200 can parally perform the inter prediction on the border row of the top half frame.

FIG. 6(b) shows a process for the first video decoder 200 to parally perform an inter prediction on a border row of a top half frame while the second video decoder 300 performs an inter prediction on the top half frame.

Referring to FIG. 6(b), the second video decoder 300 performs an inter prediction on a top half frame of a frame N. In parallel with this, the first video decoder 200 can perform an inter prediction on a border row adjacent to a bottom of the top half frame.

In particular, the border row may mean at least one of a plurality of coding unit rows located on the bottom of the top half frame. Moreover, a size of the border row, i.e., the number of coding unit rows configuring the order row can be adaptively determined in consideration of a speed for processing a frame in the second video decoder 300. For instance, if a time taken for the second video decoder 300 to perform an inter prediction on a half frame exceeds a predetermined time, it means that capacity of the second video decoder 300 is reduced. Hence, a size of a border row inter-predicted by the first video decoder 200 can be set to a large size. On the contrary, if a time taken for the second video decoder 300 to perform an inter prediction on a half frame does not exceed the predetermined time, a size of the border row can be set to a small size. Yet, in FIG. 6(b), a case of configuring the border row with 1 coding unit row and configuring a bottom half frame of a frame N with 8 coding unit rows is taken as one example.

The first video decoder 200 can reconstruct each of an inter-predicted border row and a top half frame inter-predicted by the second video decoder 300. Subsequently, the first video decoder 200 is able to perform an in-loop filtering on the reconstructed top half frame. In doing so, it is able to perform the in-loop filtering on at least one sample of the reconstructed top half frame using at least one sample of the reconstructed border row. In this case, since a sample of the reconstructed border row is usable, all 8 coding unit rows configuring the reconstructed top half frame can be decoded.

Furthermore, if an inter prediction is performed on a top half frame of a frame (N+1) by referring to a top half frame of a decoded frame N, since all 8 coding unit rows of the top half frame of the frame N are decoded, the second video decoder 300 can inter-predict 8 coding unit rows of the top half frame of the frame (N+1) as well. Thus, while the second video decoder 300 performs the inter prediction on the top half frame, if the first video decoder 200 parally performs an inter prediction on a border row, it is able to decode a whole top half frame configured with 8 coding unit rows per frame.

INDUSTRIAL APPLICABILITY

The present invention can be used in coding a video signal.

What is claimed is:

1. A method of parallel processing a video signal bitstream by a first video decoder and a second video decoder, the method comprising:
    parallelly performing a reconstruction procedure on a bottom half frame of frame N−1 and an in-loop filter on the reconstructed bottom half frame of frame N−1 at the first video decoder and an inter prediction on a top half frame of frame N at the second video decoder,
    wherein the reconstruction procedure includes inverse quantizing transform coefficient information, inverse transforming the inverse quantized transform coefficient information to obtain residual data, performing an intra prediction for intra-coded blocks, and reconstructing sample values using predicted sample values and the residual data;
    parallelly performing the reconstruction procedure on the inter-predicted top half frame of frame N and the in-loop filter on the reconstructed top half frame of frame N at the first video decoder and the inter prediction on a bottom half frame of frame N at the second video decoder; and
    parallelly performing the reconstruction procedure on the inter-predicted bottom half frame of frame N and the in-loop filter on the reconstructed bottom half frame of frame N at the first video decoder and the inter prediction on a top half frame of frame N+1 at the second video decoder,
    wherein motion information for the inter prediction and the transform coefficient information are extracted by the first video decoder from the video signal bitstream, and the first video decoder provides the second video decoder with the extracted motion information for the inter prediction.

2. An apparatus for parallel processing a video signal, the apparatus comprising:
    a first video decoder and a second video decoder configured to:
    parallelly perform a reconstruction procedure on a bottom half frame of frame N−1 and an in-loop filter on the reconstructed bottom half frame of frame N−1 at the first video decoder and an inter prediction on a top half frame of frame N at the second video decoder,
    wherein the reconstruction procedure includes inverse quantizing transform coefficient information, inverse transforming the inverse quantized transform coefficient information to obtain residual data, performing an intra prediction for intra-coded blocks, and reconstructing sample values using predicted sample values and the residual data;
    parallelly perform the reconstruction procedure on the inter-predicted top half frame of frame N and the in-loop filter on the reconstructed top half frame of frame N at the first video decoder and the inter prediction on a bottom half frame of frame N at the second video decoder; and
    parallelly perform the reconstruction procedure on the inter-predicted bottom half frame of frame N and the in-loop filter on the reconstructed bottom half frame of frame N at the first video decoder and the inter prediction on a top half frame of frame N+1 at the second video decoder,
    wherein motion information for the inter prediction and the transform coefficient information are extracted by the first video decoder from the video signal bitstream, and the first video decoder provides the second video decoder with the extracted motion information for the inter prediction.

* * * * *